May 16, 1944.  V. B. NOVAK  2,349,051
MIXING VALVE
Filed Oct. 27, 1941
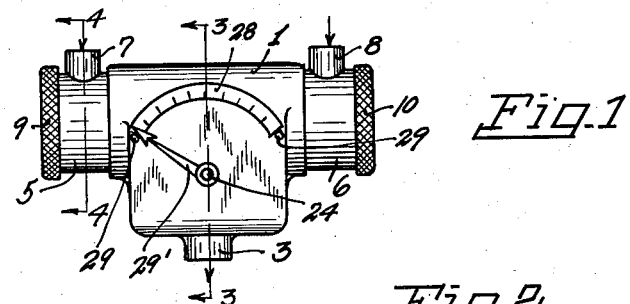
Fig.1
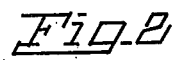
Fig.2
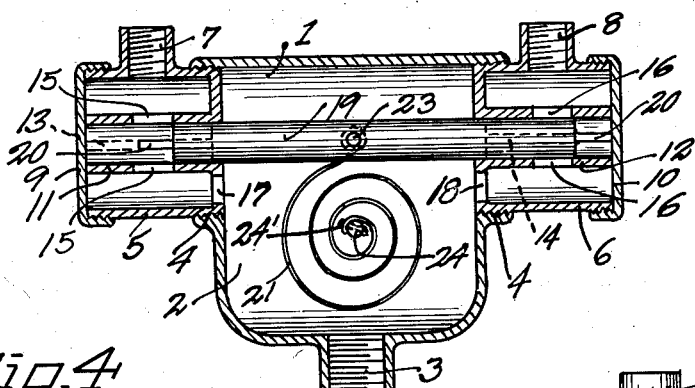
Fig.4
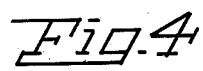
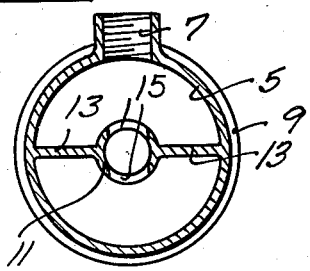
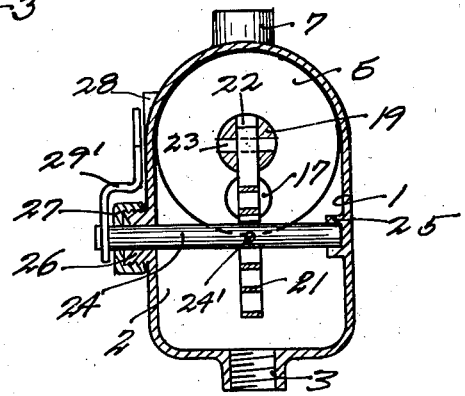
Fig.3
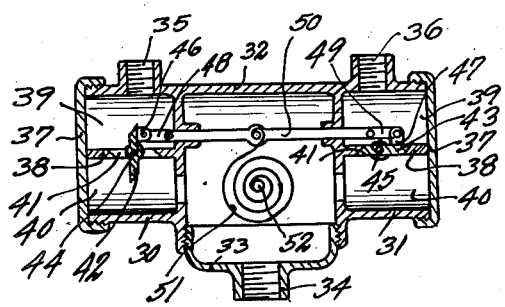
Fig.5
Inventor
Victor B. Novak
By
Attorney Patented May 16, 1944

2,349,051

UNITED STATES PATENT OFFICE 2,349,051

MIXING VALVE

Victor B. Novak, Nome, Alaska

Application October 27, 1941, Serial No. 416,744

1 Claim. (Cl. 236—12)

This invention relates to a temperature controlling device or mixing valve and more particularly to a device of this character for controlling the temperature of water flowing to a place at which the water is to be used.

Another object of the invention is to provide a mixing valve of such construction that flow of hot and cold water through a mixing chamber of the valve may be controlled by a thermostat and the temperature of water delivered through the outlet of the mixing chamber maintained at a predetermined temperature.

Another object of the invention is to provide a valve having chambers for hot and cold water at opposite sides of the mixing chamber, flow of water through these chambers into the mixing chamber being controlled by a valve so constructed and mounted that as flow of cold water is gradually shut off, flow of hot water will be correspondingly increased and adjustment of the valve finally brought to a stop at a position in which water of the desired temperature will be delivered from the mixing chamber.

Another object of the invention is to provide a mixing valve wherein a spring controlling movement of the valve has one end connected with the valve and its other end anchored to a shaft which is rotatably mounted for turning movement to place the spring under predetermined tension and held in adjusted position by frictional binding between the shaft and walls of bearings in which the shaft is rotatably mounted.

Another object of the invention is to provide a mixing valve which is simple in construction, efficient in operation and not liable to get out of order when in use.

In the drawing:

Fig. 1 is a side elevation of the improved mixing valve.

Fig. 2 is a sectional view taken longitudinally through the mixing valve.

Fig. 3 is a transverse sectional view taken vertically through the valve on the line 3—3 of Fig. 1.

Fig. 4 is a transverse sectional view on the line 4—4 of Fig. 1.

Fig. 5 is a sectional view taken longitudinally through a modified form of valve construction.

This improved mixing valve has a body 1 formed of cast metal and defining a chamber 2 provided at its bottom with an outlet neck 3 with which a pipe for conducting water to a place of use is to be connected. Threaded openings 4 are formed through walls of the mixing chamber 2 at opposite ends of the body and into these openings are screwed the externally threaded inner ends of auxiliary casings 5 and 6 formed with inlet necks 7 and 8 at their tops and having their outer ends normally closed by caps 9 and 10 which are in threaded engagement with the casings so that they may be removed when necessary. Sleeves 11 and 12 extend longitudinally through the casings 5 and 6 axially thereof between webs 13 and 14 with their outer ends closed by the caps 9 and 10 and these sleeves have slots or ports 15 and 16 so that water entering the auxiliary casings may pass through the sleeves to lower portions of the casings and through the openings 17 and 18 into the mixing chamber. It will thus be seen that when the valve is installed with the necks 7 and 8 connected with pipes leading from sources of cold and hot water and the neck 3 connected with a pipe leading to a place of use, hot and cold water may be fed into the mixing chamber and mixed therein to provide a supply of water of a predetermined temperature for delivery to the place of use.

Flow of water from the auxiliary casings or chambers is controlled by a valve member 19 consisting of a metal bar of such length and diameter that it passes through the mixing chamber and has its end portions snugly received in the sleeves. When the valve bar is in the position shown in Fig. 2, it blocks flow of hot water through sleeve 12 and unrestricted flow of cold water is permitted through the sleeve 11. As the valve member or bar is shifted longitudinally toward the left of this figure, its right end portion gradually moves out of blocking relation to the ports 16 and, at the same time, its left end portion moves into blocking relation to the ports 15. Therefore, flow of cold water will be gradually reduced and flow of hot water gradually increased until flow of cold water is entirely cut off and hot water alone delivered to the mixing chamber. Since the hot and cold water mixes in the chamber 2, water of the desired temperature will be delivered through the pipe leading from the outlet neck 3 to the place of use. Stops 20, which project from ends of the valve bar, limit movement of the bar and prevent movement of the bar beyond a position in which flow of water through one sleeve will be entirely cut off and flow of water at full volume allowed through the other sleeve.

The spring 21 of the thermostat by means of which movement of the valve bar is controlled, is formed of resilient metal which is expansible and contractible in response to temperature changes. This thermostat spring is disposed under the valve bar and has its outer end engaged in a slot 22 formed in the valve bar where it is secured by a pin 23 which passes transversely through the bar. The inner end of the spring is secured by a pin 24' to a shaft 24 which extends transversely through the mixing chamber and is rotatably mounted in bearings 25 and 26. One end portion protrudes from the bearing 26 and a cap or gland 27 is screwed upon this bearing to provide a tight seal and prevent leakage of water therethrough. The shaft has frictional binding engagement with the bearings and the cap 27 and, when it is turned, the spring will be wound or unwound, according to the direction in which the shaft is turned, and tension of the spring so regulated that the valve bar will be held in a predetermined position for water of a certain temperature and moved by expansion or contraction of the spring to admit increased flow of hot or cold water when needed to restore the water in the mixing chamber to the desired temperature. An arcuate scale 28 having abutment pins 29 at its ends is formed on the casing 1 concentric to the shaft and the shaft carries a pointer 29' extending from the outer end of the shaft radially thereof with its free end crossing the scale. Appropriate temperature markings may be provided on the scale for accurate setting of the spring or the scale may be left blank and the proper point along the scale to stop movement of the pointer to obtain water of a desired temperature, learned by experience.

In Fig. 5 there has been illustrated a mixing valve of a modfied construction. In this embodiment, the auxiliary casings 30 and 31 are formed integral with the main casing 32 and the bottom 33 of the main casing carrying the outlet neck 34 is threaded into place. Inlet necks 35 and 26 for hot and cold water extend upwardly from the auxiliary casings and outer ends of these casings are closed by caps 37 threaded on the casings. Partitions 38 divide the auxiliary casings into upper and lower chambers 39 and 40, and openings 41 are formed through the partitions so that water may flow through the communicating chambers and through the openings 4 into the mixing chamber. The openings 41 have beveled walls to limit tilting movement of the valve discs 42 and 43 which are pivotally mounted in the openings by pins 44 and 45. Ears 46 and 47 extend upwardly from the valve discs and are pivoted to outer ends of links 48 and 49 which have their inner ends pivoted to ends of a rod 50 which extends through the mixing chamber and midway its length is secured to the outer end of a thermostat spring 51 corresponding to the spring 21 and having its inner end fixed to a shaft 52 corresponding to shaft 24. By turning the shaft as previously set forth, tension of the spring may be controlled and the valves opened and closed to regulate flow of hot and cold water through the valve and maintain the water at a predetermined temperature.

Having thus described the invention, what is claimed is:

In a mixing valve, a main casing defining a mixing chamber and having an outlet at its bottom, extensions at opposite ends of said main casing spaced upwardly from the bottom thereof and defining auxiliary chambers in opposed relation to each other, said auxiliary chambers having upper inlets and at their bottoms having outlets at their inner ends establishing communication with the mixing chamber in spaced relation to the bottom thereof, tubular sleeves extending horizontally through said auxiliary chambers above the outlets thereof and open at their ends, horizontal webs between opposite sides of said sleeves and side walls of the auxiliary chambers serving to support the sleeves and constituting partitions dividing the auxiliary chambers into upper inlet portions and lower outlet portions, said sleeves being formed with upper and lower alined openings for passage of liquid through the sleeves between upper and lower portions of the auxiliary chambers, caps detachably carried by outer ends of said extensions and closing outer ends of the sleeves and upper and lower portions of the auxiliary chambers, a plunger extending horizontally through the mixing chamber with its end portions snugly received in said sleeves and slidable longitudinally therein into and out of blocking relation to openings of the sleeves, and thermostatic means in said mixing chamber for controlling movement of said plunger.

VICTOR B. NOVAK.